March 24, 1970 G. R. STEHL 3,502,163

EQUAL ARM BALANCE WITH C-SHAPED FULCRUM SLEEVE FORMED ON BEAM

Original Filed May 14, 1968

INVENTOR.
GEORGE R. STEHL

BY David C. Petre
James J. Ralabate
ATTORNEYS

United States Patent Office 3,502,163

Patented Mar. 24, 1970

3,502,163

EQUAL ARM BALANCE WITH C-SHAPED FULCRUM SLEEVE FORMED ON BEAM

George R. Stehl, Stoney Brook, N.Y., assignor, by mesne assignments, to Xerox Corporation, Rochester, N.Y.

Continuation of application Ser. No. 729,024, May 14, 1968. This application Mar. 3, 1969, Ser. No. 805,111

Int. Cl. G01g *21/00*

U.S. Cl. 177—126 15 Claims

ABSTRACT OF THE DISCLOSURE

A simple, durable, inexpensive equal arm balance scale especially adapted for use by educational institutions below college level, in a preferred embodiment comprising an integral support and bearing member and a one piece equal arm beam member integrally including a fulcrum and an indicator finger, said equal arm beam member adapted to be slidably fitted with the support and bearing member in a direction normal to the plane of beam weighing movement, the ends of each arm of said equal arm beam member adapted to slidably receive in snug fit a C-shaped member terminating in means suspending a pan in gimbal fashion.

CROSS REFERENCES TO RELATED APPLICATIONS

This application is a continuing application of my application Ser. No. 729,024, filed May 14, 1968, which was copending with the instant application when it was filed and which is now abandoned.

BACKGROUND OF THE INVENTION

This invention relates to scales and more specifically to an equal arm balance scale.

An equal arm balance is a fundamental tool for the teaching of many principles in learning institutions below the college level. Numerous efforts have been made to construct simple and inexpensive balances in order to provide as many balances per class as possible. Recent efforts in this area are typified by Vash et al. Patent 3,354,971 and Ruchlis Patent 3,339,291. The scales described therein although satisfactory in some respects in being simpler and less expensive than prior art balance scales, are relatively complicated when compared to the novel and advantageous scale of this invention.

SUMMARY OF THE INVENTION

It is, therefore, an object of this invention to provide an equal arm balance which is simpler, more durable, less expensive and still more pleasing from a design viewpoint, than prior art balances and otherwise more suitable for use in learning institutions below the college level.

It is a further object of this invention to provide an equal arm balance which is compact when assembled.

It is a further object of this invention to provide an equal arm balance which is quickly disassemblable for easy storage in a very small space.

It is a further object of this invention to provide an equal arm balance which in a preferred embodiment requires not a single grommet, screw, bolt, rivet or similar fastener type connection.

It is a further object of this invention to provide an equal arm balance which in addition to its many mechanical advantages possesses a pleasing design.

The foregoing objects and others are accomplished in accordance with this invention by providing an equal arm balance comprising an integral support and bearing member and a one piece equal arm beam member integrally including a fulcrum and an indicator finger, said equal arm beam member adapted to be slidably fitted with the support and bearing member in a direction normal to the plane of beam weighing movement, the ends of each arm of said equal arm beam member adapted to slidably receive in snug fit a C-shaped member terminating in means for suspending a pan in gimbal fashion.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

Figure 1:
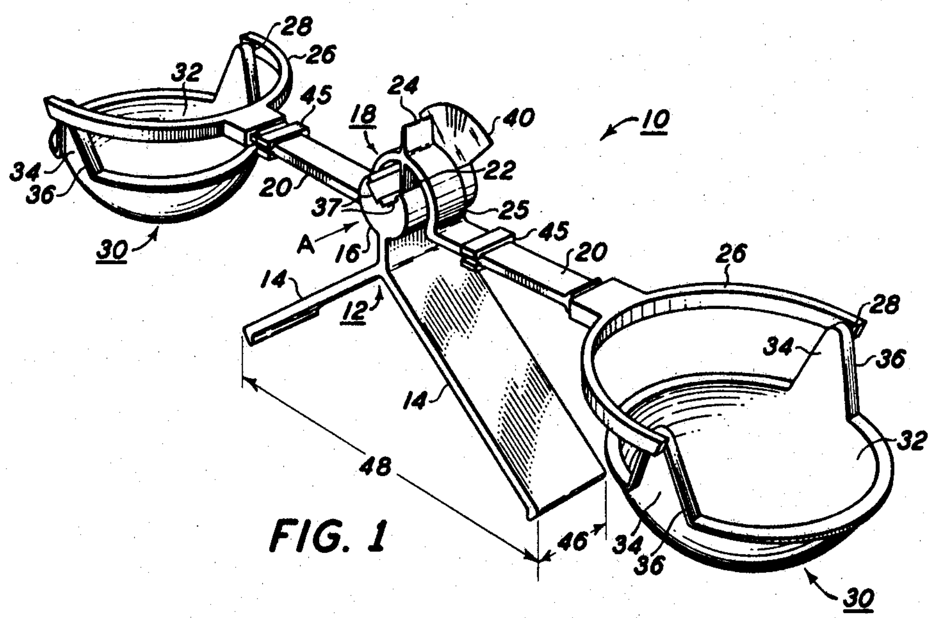
FIG. 1 is a back-side perspective view of a preferred embodiment of the balance scale of this invention.

Referring now to FIG. 1, there is shown balance scale 10 made up of member 12 comprising legs 14 of sufficient width 46 to stabilize the scale, diverging from cylindrical bearing means 16; and an integral equal arm beam member 18 comprising equal arms 20, fulcrum 22 and indicator finger 24 all distending from sleeve 25 of C-shaped cross section which typically, and as shown, corresponds to an arcuate segment of a circle.

Figure 2:
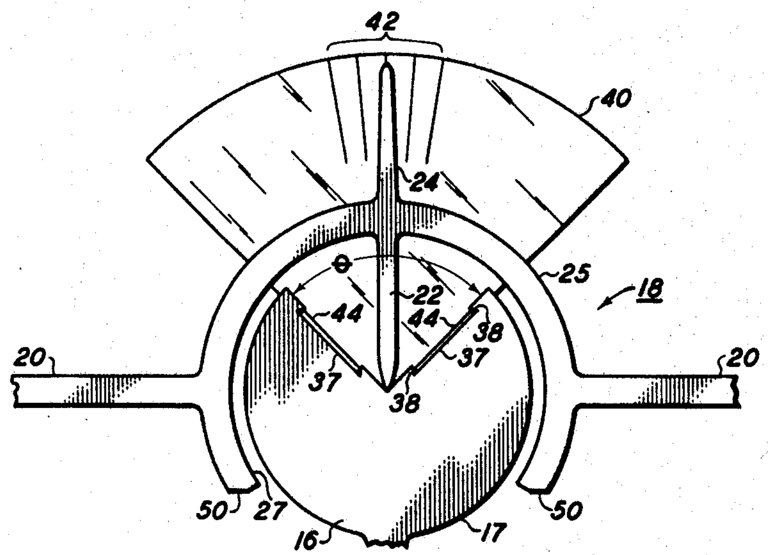
FIG. 2 is a back view of an alternative embodiment of the bearing, fulcrum, indicator finger portion of the scale as viewed in the direction of arrow A in FIG. 1.

Preferably, and as shown, also in FIG. 2, indicator finger 24 and fulcrum 22 distend in opposed relation from C-shaped sleeve 25. Preferably, sleeve 25 sufficiently encloses bearing means 16 so that members 18 and 12 may not be disassembled by simply lifting member 18 in an upward direction because of the inhibiting engagement by the lower extremities 50 of sleeve 25 on bearing means 16. This permits the scale to be readily transported from one location to another, while simultaneously permitting ready assembling by simply sliding, in the direction of arrow A, member 18 into working engagement with member 12. Disassembly is readily accomplished by sliding member 18 in a direction opposite arrow A or by slidably removing indicator 40 and further sliding in the direction of arrow A.

Snugly fitted to the ends of each arm 20 is a C-shaped member 26. Each C-shaped member terminates at the ends of the C in lugs 28. Each pan 30 is made up of a lower, hollowed, semi-spherical material holding means 32 with two opposed, triangularly shaped upstanding arms 34 integrally connected to material holding means 32. Each arm 34 is flange 36 edged, the apex of each flange edged arm engaging the lugs adjacent the ends of C-shaped members 26 to permit pan 30 to incline freely so that the force exerted on lugs 28 by the material holding means 32 either empty or with material in it will be substantially completely linear with little or not twisting force or moment between the flange and the lug.

Referring more particularly to cylindrical bearing means 16, which is also shown in FIG. 2, it is seen that bearing means 16 is a cylinder with a V-shaped notch axially disposed in the top portion thereof. The inside of the V-shaped notch at its apex, where the fulcrum 22 bears, may be formed of agate or similar material snugly fitted in the material typically comprising member 12 (not shown herein), for example, as taught by Jankower Patent 1,290,564; or for simplicity and economy may simply be constructed, as shown, of the material comprising the rest of member 12. The V-shaped groove conveniently runs the entire width of cylindrical bearing means 16 but need only be wide enough to accommodate the width of fulcrum 22. Preferably the V-shaped groove should run to at least one face of member 16 for easy assembly and disassembly as heretofore explained. It is seen that, in the preferred embodiment illustrated, the two inside faces of the V-shaped groove are not flat but each face of the groove contains an axially disposed channel 37, with converging flanges 38. Indicator 40, a sector with distending fastening means, comprises a scale portion 42 and distending legs 44 each leg of a width slightly smaller than the width of the bottom portion of channel 37 so that the legs may be slid into the channel and secured there by the converging flanges to secure indicator 40 to member 12. The channel runs to at least one face of the cylindrical member 16 and for a sufficient distance along the faces of the V-groove to permit channel 37 and flanges 38 to firmly hold legs 44 to secure indicator 40. Conveniently, and as shown, channels 37 run the entire width of cylindrical bearing means 16.

A rider 45 is mounted on each arm 20 to initially set the zero point of the balance, indicated by the registering of indicator finger 24 with respect to the zero portion of scale 42. It will also be appreciated that the riders 45 may be used in cooperation with a scale on one or both of the arms 20 for precise weighing. Riders 45 may be simply formed from flat strips of aluminum bent about arm 20 and slidable thereon or of molded plastics such as styrene.

An equal arm balance made for commercial introduction and made in accordance with the invention weighs accurately up to about 0.1 gram and has the following makeup: members 12 and 18 are made of cut, extruded aluminum; pans 30, C-shaped members 26 and the riders 45 are made of injection molded styrene and the indicator 40 is made up of transparent cellulose acetate. Member 12 has a width 46 of about 1½ inches and a distance 48 between the outermost extremities of legs 14 of about 7 inches. The height from the apex of the V-shaped groove forming the bearing and the lowermost extremities of the legs 14 is about 3½ inches. The radius of the cross section circular face of cylindrical bearing means 16 is about 0.515 inch.

Member 18 is about ⅝ inch wide, about 8 inches long measured from the ends of arms 20, with the inside radius of the circular segment cross section of sleeve 25 of member 18 being about 0.561 inch and the outside radius being about 0.661 inch. This provides a distance of about 0.046 inch between the inside face 27 of sleeve 25 and the outer surface 17 of cylindrical bearing means 16 to permit free rotation of member 18 in the bearing provided by the V-shaped notch. The distance from the bottom-most portion of the fulcrum to the topmost portion of the indicator finger is about 1⅛ inches with the direct vertical distance between the top of indicator finger 24 to the bottom-most portion 50 of sleeve 25 being about 1½ inches.

The bottom portion of each channel 37 is about 0.328 inch wide while the distance between the top of the inwardly extending flanges is about 0.281 inch. The width of each distending leg 44 which slides into the channel is about 0.30 inch. The thickness of the indicator 40 is about 0.020 inch and the distance from the top of the indicator to its apex is about 1⁷⁄₃₂ inches. The indicator at least in the region of scale 42 should preferably be transparent, so the indicator finger may be seen as one looks through the scale portion.

While angle $\theta$ is about 106 degrees, it is clear that this angle made be made smaller to provide a more severe dampening effect. The diameter of the pans measured to the outer rim is about 3¾ inches with a depth of about 1½ inches with the measurement from the bottom of the pan to the top of arms 20 being about 2⅝ inches.

Although specific components and proportions have been stated in the above description of the preferred embodiments of the equal arm balance of this invention, other suitable materials may be used. In addition, many modifications in the structure of the preferred embodiment will occur to those skilled in the art upon a reading of this disclosure including:

(a) Having an aperture in the apex portion of arms 34 to engage lugs 28 in a sleeve-shaft (the lug) arrangement;

(b) Employing a bearing means 16 other than in cylindrical shape such as an elongate member with a square, sector, triangular, rectangular or other polygon cross section or irregular cross section with a V-shaped notch in the top portion thereof with a sleeve 25 of almost any cross section so long as the aperture of the sleeve is large enough to freely rotate around the edges of this modified member 16 during normal weighing movement;

(c) Almost any pan arrangement of the prior art may be subtended by suitable fastening means from the extremities of balance arms 20;

(d) Bearing means 16 may be secured to a plane rectangular, wooden or other suitable support as opposed to the integrally connected distending legs 14 in the preferred embodiment hereof;

(e) The end portion of fulcrum 22 which bears on the apex of the V-shaped notch need not be a knife edge but may be dulled or rounded to provide for greater dampening which is typically accompanied with somewhat less accuracy;

(f) Sleeve 25 may be completely closed if bearing means 16 is supported by a thin or offset column, or a support which connects to a face of bearing means 16.

It will be understood that various other changes in the details, materials, and arrangements of parts, which have been herein described and illustrated in order to explain the nature of the invention, will occur to and may be made by those skilled in the art upon a reading of this disclosure and such changes are intended to be included within the principle and scope of this invention.

What is claimed is:

1. A balance comprising:

(a) a support;

(b) an elongate bearing means connected to said support, said elongate bearing means comprising a cylinder having a V-shaped notch disposed on the top portion and extending axially along the length thereof adapted to receive a fulcrum;

(c) a sleeve means having a C-shaped cross section with the open part of the C extending downward, said sleeve means sufficiently encompassing said elongate bearing means so that lifting disengagement of said sleeve means from said elongate bearing means is prohibited by inhibiting engagement of inside portions of said sleeve means with the outer portion of said elongate bearing means;

(d) a fulcrum extending downward from the inside of the sleeve means, said fulcrum comprising a wedge adapted to fit into and having a width at least slightly less than the length of the notch on the top portion of said elongate bearing means and the sleeve adapted to fit about said elongate bearing means without contacting it during normal weighing movement except with said fulcrum;

(e) two arms in opposed relation extending from the outside of said sleeve means; and (f) an indicator finger extending upward from the outside back portion of the C in opposed relation to said fulcrum wedge.

2. A balance according to claim 1 wherein the V-shaped notch extends to at least one end of the elongate bearing means.

3. A balance according to claim 2 wherein said sleeve means, said fulcrum wedge, said indicator finger and said arms are all one integral member.

4. A balance according to claim 3 wherein said support comprises a pair of legs diverging and integrally connected to said elongate bearing means, said legs of sufficient dimension in the elongate direction of said elongate bearing means to stabilize the entire balance during operation.

5. A balance according to claim 4 including in combination a pan secured in gimbal fashion to the end of each of said arms.

6. A balance according to claim 5 including a C-shaped member slidably inserted in snug fit on the end of each of said arms, the arms engaging said C-shaped member at the outside back portion of the C.

7. A balancing according to claim 6 wherein at least one of said C-shaped members terminates in a lug at each end of said C on the inside thereof.

8. A balance according to claim 7 wherein each of said pans comprises a hollowed, semi-spherical material holding lower portion with two opposed, triangularly shaped upstanding arms, each arm being flange edged, the apex of each flange edged arm engaging a lug.

9. A balance according to claim 3 wherein axially disposed on at least one face of said V-shaped notch is a channel with converging flanges, the channel extending to at least one face of the elongate bearing means.

10. A balance according to claim 8 wherein axially disposed on at least one face of said V-shaped notch is a channel with converging flanges, the channel extending to at least one face of the elongate bearing means.

11. A balance according to claim 9 additionally comprising an indicator to cooperate with said indicator finger to show balance, said indicator comprising at least one distending leg slidably inserted into and snugly fitted and retained in said channel.

12. A balance according to claim 10 additionally comprising an indicator to cooperate with said indicator finger to show balance, said indicator comprising at least one distending leg slidably inserted into and snugly fitted and retained in said channel.

13. A balance according to claim 5 wherein the arms extend outward from each downward extending extremity of said C-shaped sleeve means.

14. Apparatus comprising:

(a) a support;

(b) an elongate bearing means connected to said support, said elongate bearing means comprising a cylinder having a V-shaped notch disposed on the top portion and extending axially along the length thereof adapted to receive a fulcrum;

(c) a sleeve means having a C-shaped cross section with the open part of the C extending downward, said sleeve means sufficiently encompassing said elongate bearing means so that lifting disengagement of said sleeve means from said elongate bearing means is prohibited by inhibiting engagement of inside portions of said sleeve means with the outer portion of said elongate bearing means;

(d) a fulcrum extending downward from the inside of the sleeve means, said fulcrum comprising a wedge adapted to fit into and having a width at least slightly less than the length of the notch on the top portion of said elongate bearing means and the sleeve adapted to fit about said elongate bearing means without contacting it during normal weighing movement except with said fulcrum; and (e) an indicator finger extending upward from the outside back portion of the C in opposed relation to said fulcrum wedge.

15. Apparatus according to claim 14 wherein said sleeve means, said fulcrum wedge and said indicator finger are all one integral member.

References Cited

UNITED STATES PATENTS

| | | | |
|---|---|---|---|
| 1,104,892 | 7/1914 | Heusser | 177—191 XR |
| 1,290,564 | 1/1919 | Jankower | 177—190 XR |
| 1,463,249 | 7/1923 | Burrows | 177—246 |
| 1,683,861 | 9/1928 | Cameron | 177—194 |
| 1,734,098 | 11/1929 | Smith | 177—195 XR |
| 1,949,844 | 3/1934 | Seederer | 308—2 XR |
| 2,097,753 | 11/1937 | Bennett | 177—197 XR |
| 2,191,635 | 2/1940 | Battenberg | 177—194 XR |
| 2,345,783 | 4/1944 | Wirth | 308—2 |
| 2,640,691 | 6/1953 | Kindseth | 177—263 XR |
| 3,185,231 | 5/1965 | Iwasaki | 308—2 XR |

FOREIGN PATENTS

| | | |
|---|---|---|
| 549,572 | 8/1956 | Belgium. |
| 322,109 | 11/1929 | Great Britain. |
| 443,209 | 2/1936 | Great Britain. |

ROBERT S. WARD, Jr., Primary Examiner

U.S. Cl. X.R.

177—191, 193, 197, 246, 263; 308—2, 245